No. 639,256. Patented Dec. 19, 1899.
R. LUCAS.
CHANGE SPEED GEAR.
(Application filed July 17, 1899.)
(No Model.) 3 Sheets—Sheet 1.

Witnesses. Inventor.
Ralph Lucas
By his Attorneys
Baldwin Davidson Wight

No. 639,256. Patented Dec. 19, 1899.
R. LUCAS.
CHANGE SPEED GEAR.
(Application filed July 17, 1899.)

(No Model.) 3 Sheets—Sheet 2.

Witnesses Inventor
Ralph Lucas,
By his Attorneys

No. 639,256. Patented Dec. 19, 1899.
R. LUCAS.
CHANGE SPEED GEAR.
(Application filed July 17, 1899.)
(No Model.) 3 Sheets—Sheet 3.

Witnesses.

Inventor.
Ralph Lucas

UNITED STATES PATENT OFFICE.

RALPH LUCAS, OF LONDON, ENGLAND.

CHANGE-SPEED GEAR.

SPECIFICATION forming part of Letters Patent No. 639,256, dated December 19, 1899.

Application filed July 17, 1899. Serial No. 724,127. (No model.)

*To all whom it may concern:*

Be it known that I, RALPH LUCAS, engineer, a subject of the Queen of Great Britain, residing at Beth Combe, Charlton road, Blackheath, London, in the county of Kent, England, have invented certain new and useful Improvements in Change-Speed Gear, of which the following is a specification.

According to this invention an endless belt (or it may be two belts running on pulleys on an intermediate shaft) of constant length works (or work) on two expanding belt-pulleys, which are actuated by springs in such a manner that they always have a tendency to expand to their largest diameter, but are held in check by the tension of the driving belt (or belts,) so that when the diameter of one pulley is reduced the other pulley expands as far as the belt (or belts) permits (or permit,) so altering the ratio of their speeds of rotation, while keeping the belt (or belts) at a constant tension. I form the periphery of each expanding pulley of a ring of steel lattice-work jointed together lazy-tongs fashion.

Figure 1:
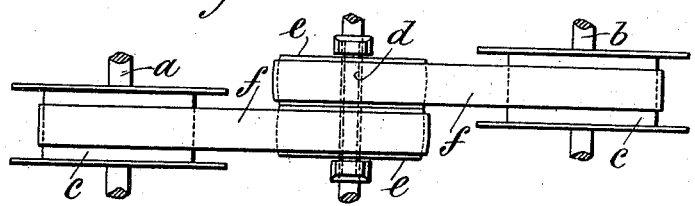
Figure 2:
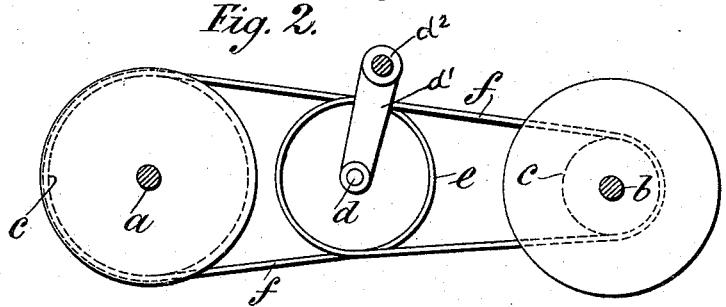
Figure 3:
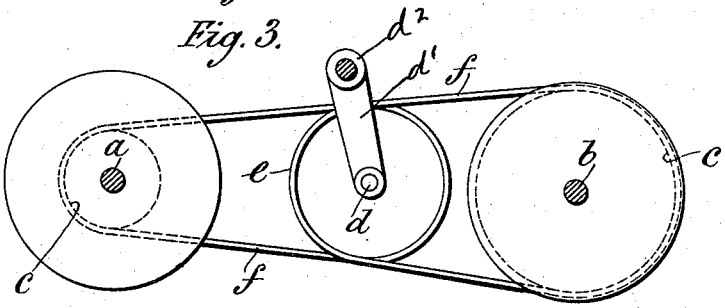
Figure 4:
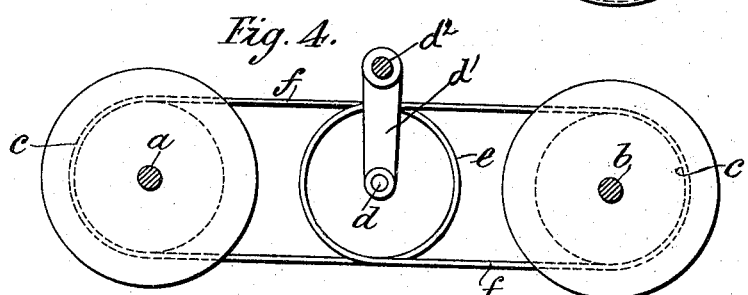
Figure 9:
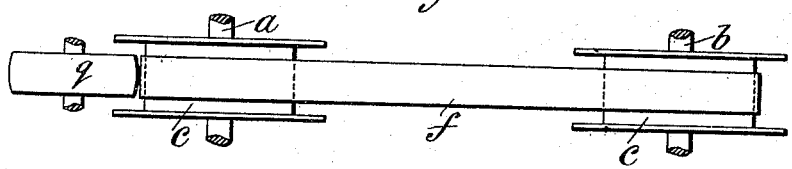
Figure 5:
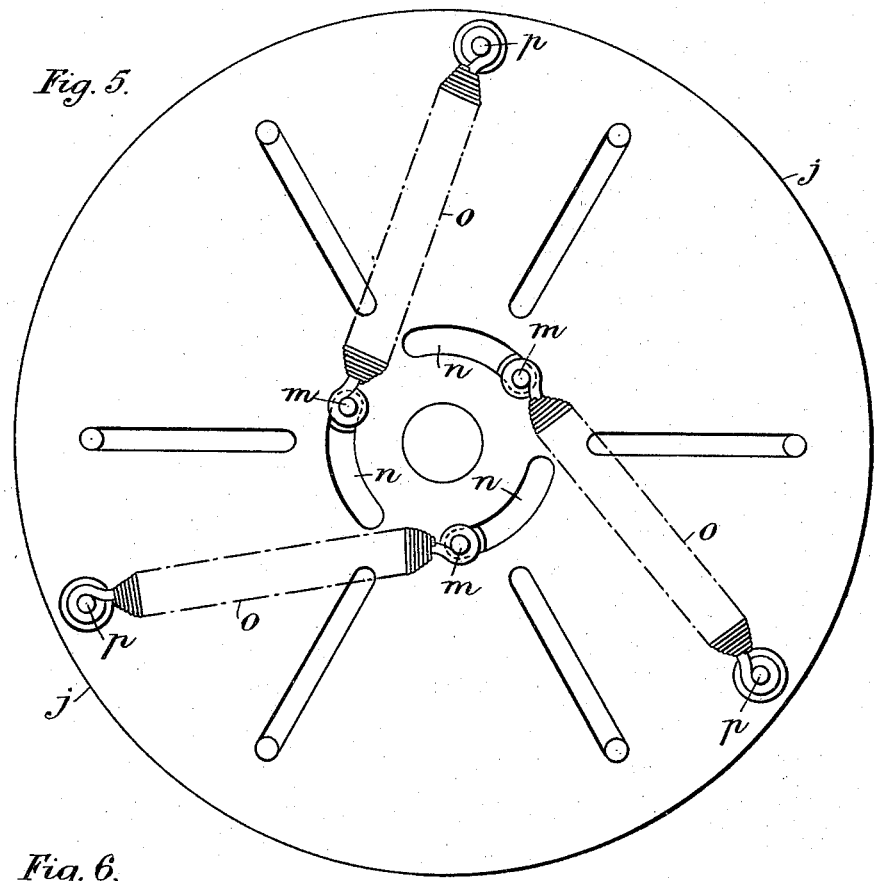
Figure 6:
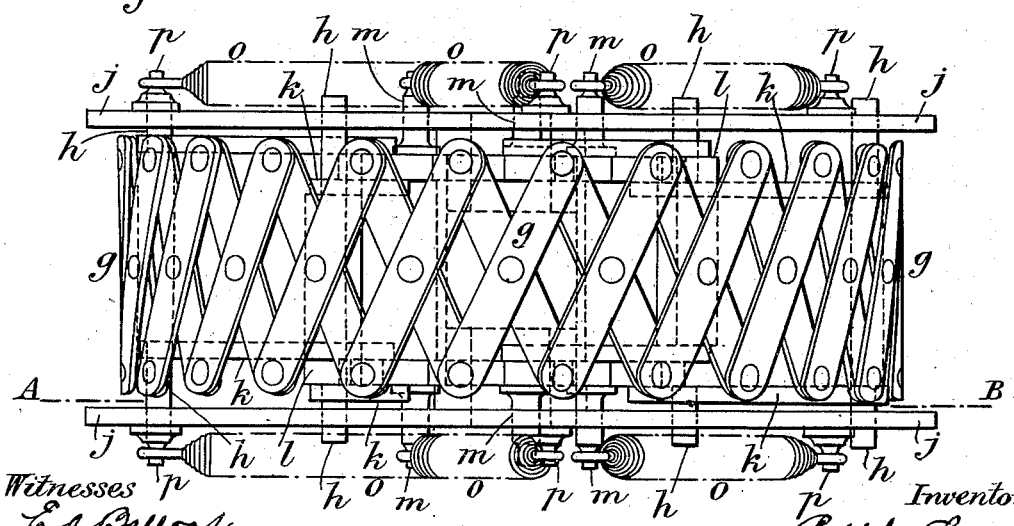
Figure 7:
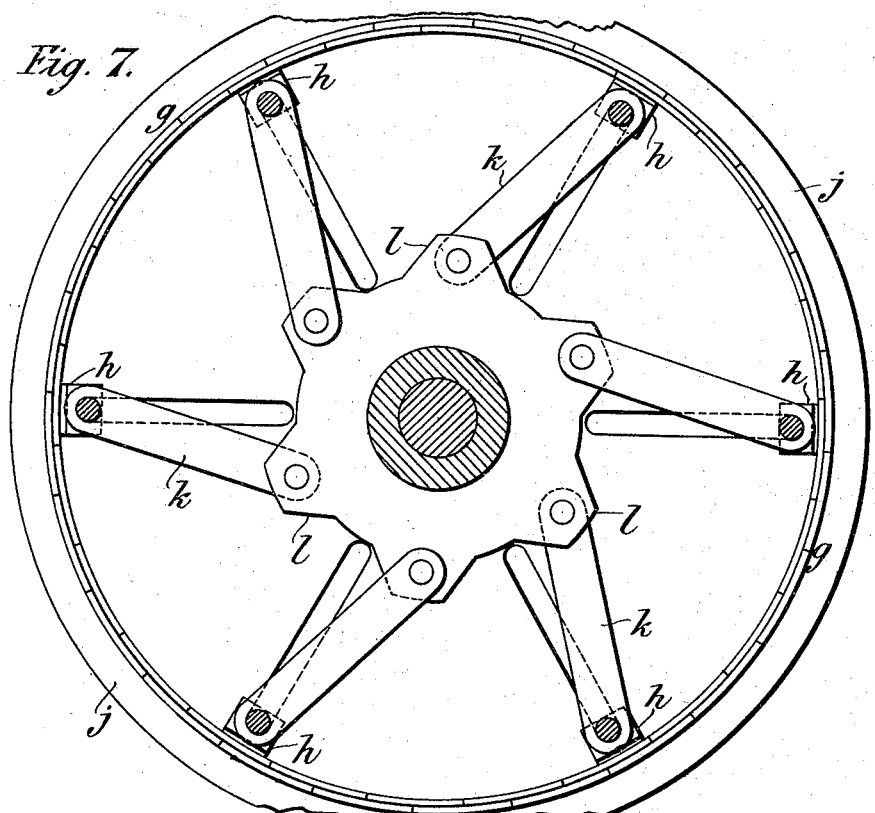
Figure 8:
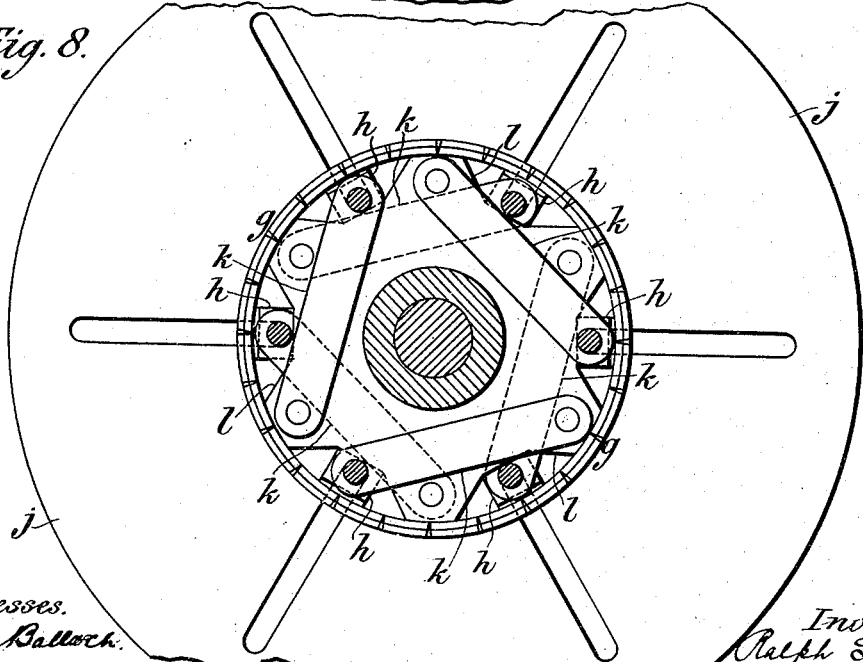

Figure 1 is an under side view of the arrangement when an intermediate shaft is employed. Figs. 2, 3, and 4 are side elevations showing the positions of the parts when driving at the fastest, slowest, and middle speeds, respectively. Fig. 5 is a side elevation, and Fig. 6 a plan, of one of the expanding pulleys. Fig. 7 is a section on the line A B, Fig. 6; and Fig. 8 is a similar view, but with the pulley contracted instead of expanded. Fig. 9 shows a modification of Figs. 1 to 4, only one belt being employed.

In Figs. 1 to 4, $a$ is the driving-shaft, and $b$ the driven shaft, and $c\ c$ are expanding pulleys fixed on them. $d$ is an intermediate shaft having two pulleys $e$ fixed to it. $f$ are belts of constant length working around the two pairs of pulleys $c$ and $e$. The shaft $d$ is movable between the shafts $a$ and $b$. For this purpose it is mounted in bearings at the ends of arms $d'$, fixed to a shaft $d^2$, which can be rocked by a lever or other convenient device. In Fig. 2 the shaft $d$ has been moved to the left, and the pulley $c$ on the shaft $a$ has expanded to its largest size, while the pulley $c$ on the shaft $b$ has been compressed to its smallest size, so that the shaft $b$ is being driven at its maximum speed, while in Fig. 3 the conditions are exactly reversed. In Fig. 4 the shaft $d$ is midway between the shafts $a$ and
$b$, and the pulleys $c$ on the two latter shafts are therefore of equal size.

Figs. 5 to 8 show the construction of the pulleys $c$. $g$ are a number of bars pivoted together at their middles and ends lazy-tongs fashion, and some of them are also pivoted at their middles to six cross-bars $h$, working in radial slots in two disks $j$, which form the sides of the pulley. The cross-bars $h$ are connected by links $k$ to plates $l$, free to turn about the axis of the pulley. $m$ are pins fixed to the plates $l$ and projecting through circular slots $n$ in the disks $j$. $o$ are springs each having one end fixed to one of the pins $m$ and its other end to a pin $p$, fixed to the disk $j$. The springs therefore always tend to expand the pulley—that is to say, bring the parts from the position shown in Fig. 8 to that shown in Figs. 5, 6, and 7.

In Fig. 9 only a single belt $f$ is employed, the pulley $c$ on the shaft $a$ being contracted by pressing a jockey-pulley $q$ against it.

What I claim is—

1. An expanding pulley having its periphery formed of a series of bars jointed together at their middles and ends lazy-tongs fashion.

2. In an expanding pulley the combination of two side disks, transverse bars working in radial slots in the disks, a series of bars jointed together at their middles and ends and some of them also pivoted at their middles to the transverse bars and means for moving the transverse bars simultaneously in a radial direction.

3. In an expanding pulley the combination of two side disks, transverse bars working in radial slots in the disks, a series of bars jointed together at their middles and ends and some of them also pivoted at their middles to the transverse bars, a plate free to turn about the axis of the pulley, links connecting the plate to the radial bars and springs tending to turn the plate.

4. The combination of two pulleys which always tend to expand, belt-gearing connecting the pulleys, and means for causing the belt-gearing to press inward the periphery of one of the pulleys.

5. The combination of two pulleys which always tend to expand, two pulleys of constant diameter on a common shaft, two belts each passing partly around one of the expanding pulleys and one of the non-expanding pulleys and means for moving the non-expanding pulleys relatively to the expanding pulleys.

RALPH LUCAS.

Witnesses:
R. B. RANSFORD,
JOHN H. WHITEHEAD.